Jan. 28, 1964     F. GAWLITZA ETAL     3,119,354
METHOD FOR THE BAKING OF BREAD AND OTHER
BAKERY PRODUCTS WITH INFRA-RED RAYS
Filed Oct. 23, 1959
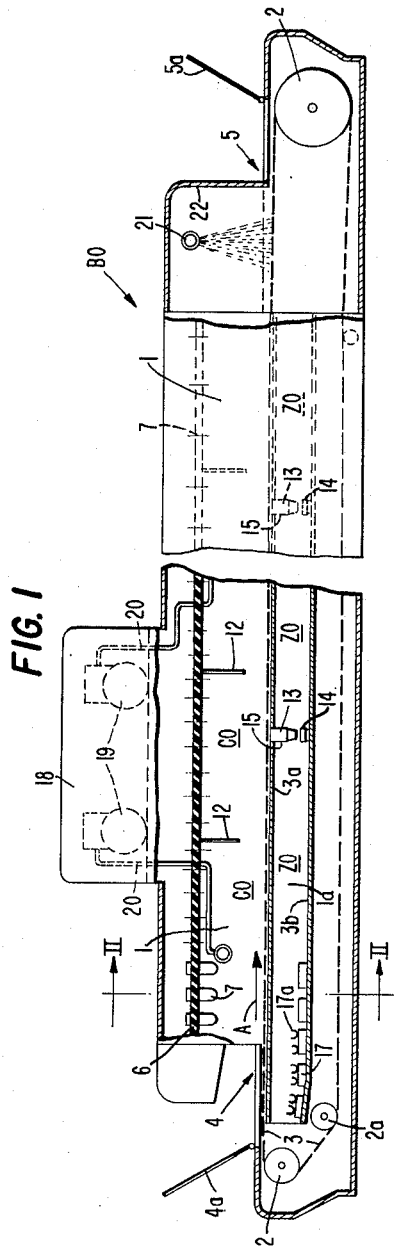
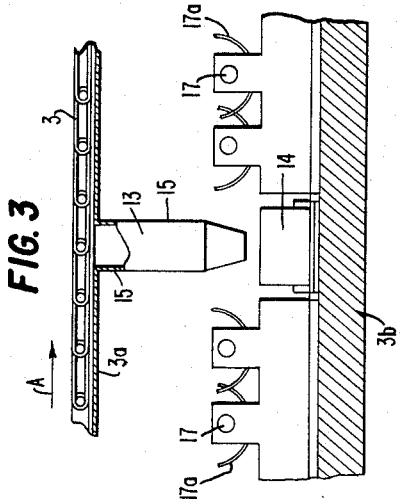
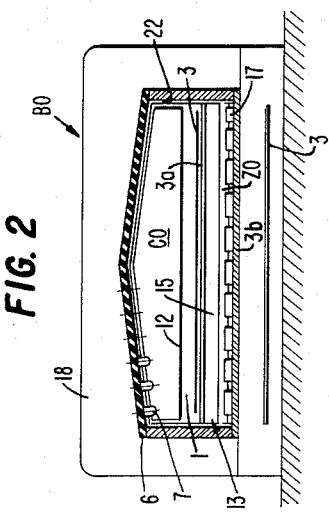
INVENTORS
FRANZ GAWLITZA,
MARTIN HONTZSCH,
FERDINAND SCHMITZ
BY    *Michael S. Striker*
ATTORNEY

United States Patent Office 3,119,354
Patented Jan. 28, 1964

3,119,354
METHOD FOR THE BAKING OF BREAD AND OTHER BAKERY PRODUCTS WITH INFRA-RED RAYS
Franz Gawlitza, Berlin-Johannisthal, and Martin Höntzsch and Ferdinand Schmitz, Dresden-Radebeul, Germany, assignors to Verband Deutscher Konsumgenossenschaften G.m.b.H., Berlin, Germany
Filed Oct. 23, 1959, Ser. No. 848,425
7 Claims. (Cl. 107—54)

The present invention relates to a method of and to an apparatus for the baking of bread, rolls and other bakery products by means of radiant heat, and more particularly with the help of short-wave infra-red rays.

It is already known to utilize infra-red rays in the baking of bread and of certain other bakery products. However, all such known methods are based on the utilization of long-wave infra-red rays. The rays are stored in a heat-absorbent body, e.g. a suitable ceramic or the like, by the burning of coal, gas, oil or with the help of electrical energy, and the heat-absorbent body then emits the rays in the desired direction or directions. The baking process is carried out by simultaneous addition of moisture for a short period of time not exceeding 1½ minutes. Such methods are utilized in connection with the baking of bread and also in connection with the baking of certain flat bakery products, such as biscuits and the like.

All presently known methods of baking bread ant like bakery products which are based on the use of infra-red rays invariably bring about a mere drying or roasting action upon the advancing products, and are connected with very high losses in heat energy. Thus, under optimum operating conditions, the ratio of usefully spent heat does not exceed 30 percent, and the baking operation requires comparatively long periods of time. For example, a loaf of bread weighing 1½ kg. will be baked in about 45 to 50 minutes, and even a roll weighing about 40 grams requires between 16 and 18 minutes before the baking is completed.

A further serious drawback of all presently known and utilized methods of baking bread, rolls and other bakery products is in that the oven must be carefully treated before the actual baking can begin, which results in heat losses and is connected with additional expenditures in time. Thus, each presently utilized infra-red baking oven requires careful heating to comparatively high temperatures before the first batch of bakery products can be placed therein. Whenever the baking of a batch is completed, the oven must be reheated to a temperature of between 240–250° C., thus enabling the heat-emitting medium to store sufficient long-wave infra-red heat energy which is thereupon emitted during subsequent baking of the next batch.

An added disadvantage of all presently utilized apparatus for the practice of the above described conventional methods is in their high initial cost, in complicated construction, in likelihood of malfunction, and in their inability to rapidly react if a change in the operating conditions is desired.

An important object of the present invention is to provide a method of baking bread with the help of short-wave infra-red rays which reduces in half the time necessary for the baking of such products in accordance with presently utilized methods.

Another important object of the invention is to provide a method of the above outlined characterstics which may be utilized in connection with the baking of bread as well as with the baking of many other products of similar consistency.

With the above and many other related objects in view, the invention resides in the provision of a method which comprises subjecting the goods to the action of short-wave infra-red rays in a steam-tight oven in such a way that the upper and lateral sides of the goods advancing on a horizontal conveyor are subjected to the direct action of infra-red rays, and simultaneously subjecting the undersides of the goods to the action of rays emitted by one or more heat-absorbing bodies (consisting, e.g. of sheet metal) which are located below the advancing goods. Initially, the heating of the goods with short-wave infra-red rays occurs in the presence of controllable quantities of water vapor until the formation of crumby bread texture is completed. The heating action is then continued in the absence of water vapor in order to complete the formation of crust on the bakery products. It is preferred to sprinkle the baked goods with a cooling water spray before removing the same from the baking oven.

The infra-red oven for the practice of the above method comprises a steam-tight housing formed with sealable inlet and discharge openings for the loading and unloading, respectively, of the goods to be baked, the housing defining a baking chamber which is divided into an upper and a lower chamber by a horizontal conveyor adapted to move the goods from the inlet toward the discharge opening. The upper chamber contains an insulating panel which serves as a carrier or support for a number of infra-red lamps preferably arranged in such a way that their heating effect upon the goods diminishes in a direction from the inlet toward the discharge opening. The insulating panel also supports a series of vertical partitions which divide the upper baking chamber into a number of compartments and prevent an equalization of temperatures in the adjacent compartments. The lower chamber is also subdivided into a series of compartments and contains heat absorbing and emitting elements which radiate the stored heat toward the undersides of the conveyed bakery products. The partitions in the lower baking chamber preferably serve as a means for leading away solid impurities which would normally settle on the conveyor, on the infra-red lamps and other parts in the baking chambers.

The apparatus further comprises means for delivering water vapor into selected compartments of both baking chambers, as well as various heat-measuring, damp- and steam-evacuating and other control devices which insure satisfactory and readily variable operating conditions in the baking oven.

Other features of the improved oven reside in the provision of a novel mounting for the infra-red lamps, in the provision of a sprinkling and cooling system for the baked goods, in the provision of means for evacuating fumes from the oven, and in the provision of interchangeable receptacles for solid impurities discharged by the partitions or chutes in the lower baking chamber.

The novel features which are considered as characteristic for the invention are set forth in particular in the appended claims. The invention itself, however, both as to its construction and its method of operation, together with additional objects and advantages thereof, will be understood from the following detailed description of a specific embodiment when read in connection with the accompanying drawing, in which:

FIG. 1 is a longitudinal vertical section through the baking oven embodying our invention;

FIG. 2 is a transverse vertical section taken along the line II—II of FIG. 1, as seen in the direction of arrows;

FIG. 3 is an enlarged fragmentary detail view showing a chute and a receptacle for solid impurities; and FIG. 4 is a fragmentary detail view showing the mounting of an infra-red lamp.

Referring now in greater detail to the illustrated embodiment, the baking oven BO comprises a housing defining a tunnel-shaped steam-tight baking chamber which includes an upper baking chamber 1 formed above the upper run of a continuously driven horizontal chain conveyor 3 travelling over spaced guiding and deflecting sprockets 2, 2a one of which is rotated by an electric motor or the like (not shown). The upper run of the conveyor 3 advances along a horizontal supporting plate 3a in the direction indicated by the arrow A. The raw bakery products to be baked in the chamber 1 are loaded onto the chains or links of the conveyor 3 through an inlet or entry opening 4, and the baked products may be removed at the other end of the upper baking chamber 1 through the discharge opening 5. The openings 4 and 5 in the housing forming part of the oven BO may be exposed and sealed by suitable operation of the lids or trap doors 4a, 5a, respectively. These trap doors may be replaced by flexible sliding doors or the like.

The upper side of the upper baking chamber 1 is bounded by an insulating support or carrier plate 6 which constitutes the upper wall of said chamber and holds say 360 short-wave infra-red lamps 7, these lamps extending into the chamber 1 and serving as a means for producing the necessary heat above and below the upper run of the conveyor 3. As is shown in FIG. 4, the sockets 8 of lamps 7 are of conical shape and have a mere linear contact with the walls of the respective openings in the insulating support plate or panel 6. That end of each socket 8 which extends upwardly beyond the panel 6 is covered by an insulating cap 9, the latter being held in proper position by an internally threaded retaining ring 10 or the like. The ring 10 facilitates ready removal of the lamp 7 and, together with the cap 9, insures steam-tight sealing of each opening in the supporting panel 6. The lamps 7 may be of any well known type, for example, the one having a stem made of hardened glass known under the name "Pyrex" (trademark). Terminals or contactors 7a serve as a means for connecting the lamps to a source of electrical energy (not shown).

The upper and lateral sides of the bakery products advancing with the conveyor 3 from the inlet opening 4 toward the discharge opening 5 are subjected to direct radiation of the lamps 7. As is best shown in FIG. 1, the chamber 1 is subdivided into a series of compartments CO by vertical partitions or walls 12. The compartments closer to the inlet or loading opening 4 contain a larger number of lamps 7 than those adjacent to the discharge opening 5. The partitions or vertical walls 12 prevent an equalization of temperatures prevailing in the adjacent compartments of the upper baking chamber 1.

The baking chamber of the infra-red oven BO further comprises a second or lower baking chamber 1a which extends along and below the upper run of the conveyor 3. This lower chamber 1a is subdivided by vertical chutes 13 which simultaneously serve as a means for conveying undesirable solid impurities into the receptacles 14 therebelow. The chutes 13 are formed by vertical walls 15 and communicate with spaced openings provided in the supporting plate 3a for the upper run of the conveyor 3. Any particulate matter entrained by the links of the conveyor 3 along the upper side of the plate 3a will automatically drop into the chutes 13 which extend the full width of the lower baking chamber 1a (see FIG. 2). For example, the shafts or chutes 13 will discharge particles of flour, rubbings or crumbs separated from the dough advancing on the conveyor 3, and any other solid impurities. Such particulate matter, especially the impurities separated from the conveyed goods by the chains or links of the conveyor 3, could form a sooty adhesive layer which is strongly heat insulating and would hinder the baking operation. Such layer would normally deposit on the chains or links of the conveyor, on the plate 3a, on the lamps 7 and on the reflectors in the lower baking chamber 1a, and would thus reduce the heating effect of the oven. The layer would also prevent proper regulation of the heating conditions. For example, the shafts or chutes 13 may divide the lower baking chamber 1a into three zones ZO the median zone of which is normally longer than the other two zones. The walls 15 of the chutes 13 prevent an equalization of temperatures prevailing in said zones. The receptacles 14 are placed onto a second supporting plate 3b which extends the full length of the lower baking chamber 1a between the runs of the conveyor 3. The receptacles may be periodically removed to evacuate the waste material accumulated therein.

The undersides of the bakery products advanced by the upper run of the conveyor 3 are heated by radiators or electric strip heaters 17 provided with reflectors 17a and mounted on the lower supporting plate 3b. Such radiators or heaters heat the plate 3a which in turn transmits heat to the underside of the products. The radiators 17 may be replaced by heat-radiation absorbing metallic sheets or the like. For example, the lower supporting plate 3b may constitute such a radiation-absorbing and radiation-emitting body to heat the plate 3a. The air heated by the radiators 17 is prevented from spreading the full length of the lower baking chamber 1a by the walls 15 of the aforementioned partitions or chutes 13, i.e. an equalization of temperatures prevailing in the adjacent zones ZO is not possible. The spacing of heating elements 17 and of their reflectors 17a depends upon the desired distribution of temperatures in the lower baking chamber 1a.

Above the upper baking chamber 1, the baking oven BO comprises a dome 18 which houses the steam and water vapor generating means including the main steam or vapor supply pipes 19. Suitable conduits 20 are connected to the piping 19 to deliver steam at low pressures into the baking chambers 1 and 1a. Adjacent to the discharge opening 5, there is provided in the upper baking chamber 1, a sprinkling assembly 21 which serves as a means for cooling the baked products before the latter are removed from the oven. If desired, the baking chambers 1 and 1a may be coated with refractory sheet metal plates 22 or the like. The oven further comprises one or more vapor or steam discharging tubes as well as various thermal elements for measuring and regulating the temperatures prevailing in the compartments of the baking chambers 1 and 1a. In addition, the oven may include unillustrated means for preheating the chains of the conveyor 3 as well as a suction device for withdrawing the fumes.

It will be seen that the novel method comprises the steps of subjecting the bakery products, in a steam-tightly sealed oven and in the presence of water vapor, to the controllable action of infra-red lamps which action is maintained for a comparatively short period of time. The infra-red rays will act directly against the upper and lateral sides of the bakery products whereas the undersides of the products are heated by radiation-absorbing and emitting sheet metal plates or the like, also in the presence of adjustable quantities of water vapor which are introduced from the outside during the formation of crumby texture in the bread loaf or the like and form steam in the baking chamber. While passing toward the upper and lateral sides of the conveyed products, the infra-red rays can readily penetrate the layer of water vapor or damp in both baking chambers. Toward the end of the baking operation, i.e. during the formation of the crust, the bakery products are exposed only to heat radiation while the supply of water vapor is cut off. In contrast to the action of long-wave infra-red rays, the short-wave infra-red rays will penetrate into the interior of conveyed bakery products to a depth of several centimeters which, due to the presence of water vapor in the initial stage of the baking operation, prevents premature formation of crust on the bread loaf, roll or the like.

Such action of the rays emanating from the short-wave infra-red lamps 7 brings about a strong heat transfer into the interior of each bakery product advanced by the conveyor 3 while the elasticity of the outer layers remains unchanged and, if the intensity of radiation is increased, such mode of operation prevents cracking or blistering of the goods during the expansion stage. This brings about the added advantage that the goods may expand to their maximum volumes. It will be readily understood that the intensity of radiation and the admission of water vapors may be varied within a certain range if it is desired to bring about a specific baking effect.

By heating to a temperature of between 95–98° C., a coagulation of albumin and agglutination of starch in the interior of the conveyed goods occurs simultaneously with the completion of swelling in the presence of water. Thus, the temperature prevailing in the interior of a product treated in accordance with our invention will seldom reach or exceed 100° C. This completes the formation of the crumby texture whereupon, and as described hereinbefore, the crust is formed by the action of short-wave infra-red rays and in the absence of water vapor.

The entire baking operation is reduced to about one-half the time necessary in the presently known baking processes. Thus, a loaf of bread weighing 1½ kg. will be baked in about 20–25 minutes, while the baking of a roll weighing about 40 grams requires between 8 and 9 minutes.

A very important advantage of the novel method is in that no preheating is necessary for the baking operation, i.e. the baking of bread or other bakery products may begin as soon as the circuit of the infra-red lamps 7 is completed and as soon as the conduits 20 are opened to admit water vapor into certain compartments of the baking chambers 1 and 1a. As is known, the lamps 7 are capable of reacting immediately to any changes in the intensity of current, which allows for very satisfactory regulation of the baking operation.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A method of baking bread and like bakery products which comprises advancing the products along a predetermined path having a first and a second section; subjecting the products to the action of short-wave infra-red rays in the presence of water vapor in such a manner that the intensity of the rays to which the products are subjected is at a maximum along the first section of said path whereby a crumby texture is formed in the products; and thereupon subjecting the products to the action of short-wave infra-red rays in the absence of water vapor in such a manner that the intensity of the rays to which the products are subjected is decreased along the second section of said path whereby a crust is formed on the products.

2. A method of baking bread and like bakery products which comprises advancing the products along a predetermined path having a first and a second section; subjecting the products to intensive action of short-wave infra-red rays in the presence of water vapor in such a manner that the intensity of the rays to which the products are subjected is at a maximum along the first section of said path whereby a crumby texture is formed in the products; thereupon subjecting the products to less intensive action of short-wave infra-red rays in the absence of water vapor in such a manner that the intensity of the rays to which the products are subjected is decreased along the second section of said path whereby a crust is formed on the products; and removing impurities from along said path while the products are being baked.

3. A method of baking bread and like bakery products which comprises advancing the products along a predetermined path having a first and a second section; subjecting the upper and lateral sides of the products to direct action of short-wave infra-red rays and simultaneously subjecting the undersides of the products to the heating action of short-wave infra-red rays-absorbing and radiating bodies in the presence of water vapor in such a manner that the intensity of the rays to which the products are subjected is at a maximum along the first section of said path whereby a crumby texture is formed in the products; continuing the action of the short-wave infra-red rays in the absence of water vapor in such a manner that the intensity of the rays to which the products are subjected is decreased along the second section of said path whereby a crust is formed on the products; and continuously removing impurities from along said path while the products are being baked.

4. A method of baking bread and like bakery products which comprises continuously advancing the products in a linear path having a first and second section; subjecting the upper and lateral sides of the advancing products to direct heating action of short-wave infra-red rays; simultaneously subjecting the undersides of the advancing products to the heating action of short-wave infra-red ray-absorbing and emitting bodies in the presence of water vapor in such a manner that the intensity of the rays to which the products are subjected is at a maximum along the first section of said path whereby a crumby texture is formed in the products; continuing the action of short-wave infra-red rays in the absence of water vapor in such a manner that the intensity of the rays to which the products are subjected is decreased along the second section of said path whereby a crust is formed on the products and continuously and automatically removing the impurities from along said path while the products are being baked.

5. A method of baking bread and like bakery products which comprises continuously advancing the products along a predetermined path having a first and a second section; subjecting the advancing products to intensive heating action of short-wave infra-red rays in the presence of water vapor in such a manner that the intensity of the rays to which the products are subjected is at a maximum along the first section of said path whereby a crumby mixture is formed in the products; thereupon subjecting the advancing products to a heating action of short-wave infra-red rays of decreasing intensity along the second section of said path in the absence of water vapor whereby a crust is formed thereon; and continuously and automatically removing solid impurities from along said path while the products are being baked.

6. A method of baking bread and like bakery products which comprises continuously advancing the products along a predetermined path having a first and a second section; subjecting the advancing products to intensive heating action of short-wave infra-red rays in the presence of water vapor in such a manner that the intensity of the rays to which the products are subjected is at a maximum along the first section of said path whereby a crumby texture is formed in the products; thereupon subjecting the advancing products to heating action of short-wave infra-red rays of decreasing intensity along the second section of said path in the absence of water vapor whereby a crust is formed thereon; cooling the advancing products with a water spray; and continuously and automatically removing solid impurities from along said path while the products are continuously advanced.

7. A method of baking bread and like bakery products which comprises continuously advancing the products along a predetermined path having a first and a second section; subjecting the upper and lateral sides of the advancing products to direct heating action of short-wave infra-red rays and simultaneously subjecting the undersides of the advancing products to the heating action of short-wave infra-red rays-absorbing and radiating bodies located therebelow in the presence of water vapor in such a manner that the intensity of the rays to which the products are subjected is at a maximum along the first section of said path whereby a crumby texture is formed in the products; continuing the direct and radiant heating action of the short-wave infra-red rays in the absence of water vapor in such a manner that the intensity of the rays to which the products are subjected is decreased along the second section of said path whereby a crust is formed on the products; subjecting the advancing products to the cooling action of a water spray; and continuously and automatically removing solid impurities from along said path to prevent contamination of the products while the products are continuously advanced.

References Cited in the file of this patent

UNITED STATES PATENTS

| | | |
|---|---|---|
| 1,543,128 | Simpson | June 23, 1925 |
| 1,728,664 | Comstock | Sept. 17, 1929 |
| 2,083,864 | Puckett | June 15, 1937 |
| 2,146,429 | Hawkins | Feb. 7, 1939 |
| 2,255,282 | Duffy et al. | Sept. 9, 1941 |
| 2,340,354 | Wells | Feb. 1, 1944 |
| 2,454,370 | Beaubien | Nov. 23, 1948 |
| 2,491,687 | Nutt | Dec. 20, 1949 |
| 2,575,291 | Owen | Nov. 13, 1951 |
| 2,784,686 | Bahlsen | Mar. 12, 1957 |
| 2,942,562 | Luc | June 28, 1960 |

FOREIGN PATENTS

| | | |
|---|---|---|
| 35,249 | Netherlands | Apr. 15, 1935 |